United States Patent [19]
Dreyer, Sr.

[11] 3,787,088
[45] Jan. 22, 1974

[54] MOTORCYCLE FAIRING

[76] Inventor: Floyd H. Dreyer, Sr., 4164 W. Washington, Indianapolis, Ind. 46241

[22] Filed: Nov. 29, 1972

[21] Appl. No.: 310,251

[52] U.S. Cl............................... 296/78.1, 280/281
[51] Int. Cl............................................. B62j 17/02
[58] Field of Search..................... 296/78.1; 280/281

[56] References Cited
UNITED STATES PATENTS
2,401,245  5/1946  Hobbs......................... 296/78.1 UX
3,154,342  10/1964  Mueller............................. 296/78.1

Primary Examiner—Richard A. Schacher
Attorney, Agent, or Firm—Trask, Jenkins & Hanley

[57] ABSTRACT

A motorcycle fairing in which a generally U-shaped yoke is mounted on a motorcycle frame. A shield is mounted on said yoke and includes a pair of laterally spaced leg panels interconnected at their upper ends by a transverse top panel. The top panel has a recess at its forward end through which the motorcycle fork and the headlight and its mounting brackets extend. A windscreen is mounted along the rearward edge of said panel. A shell having an opening through which the headlight projects extends across the recess in the top panel and is connected to the headlight bracket for movement with the motorcycle fork. And a mud guard is mounted on said fork below said shell and forwardly of said leg panels.

9 Claims, 5 Drawing Figures

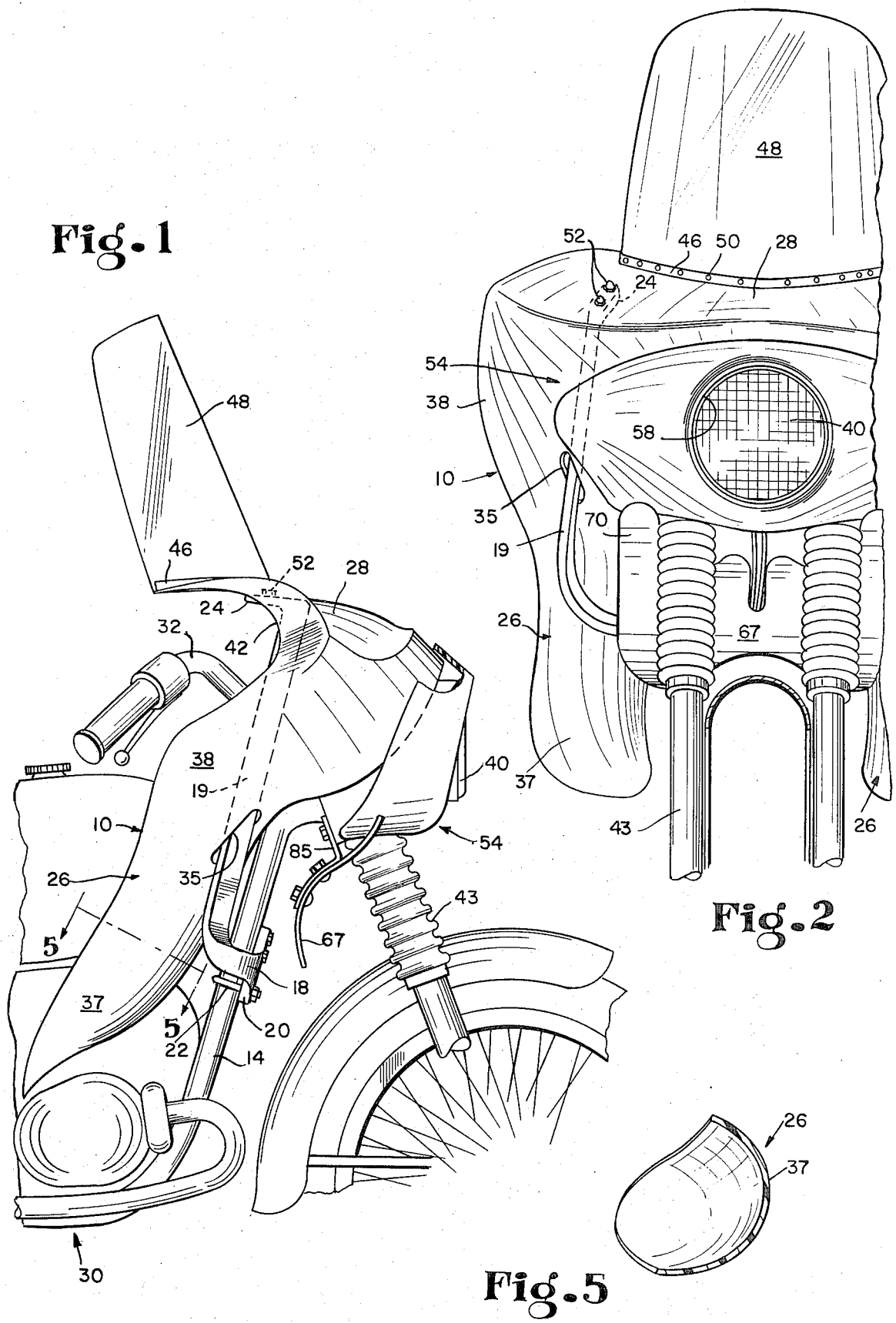

MOTORCYCLE FAIRING

BACKGROUND OF THE INVENTION

Fairings for motorcycles are well known in the art. Such fairings have been connected to the motorcycle frame and remain fixed irrespective of the movement of the handle bars. Others have been connected to the handle bars for movement therewith. And others have employed a lower portion connected to the frame and hingedly joined to an upper portion connected to the handle bars for swinging movement therewith. Fairings of these types are disclosed in Meuller U. S. Pat. No. 3,154,342, Premont U. S. Pat. No. 1,729,086, and Harley U. S. Pat. No. 1,360,945, respectively.

Fairings of these types have certain disadvantages in that they either don't protect the rider from the wind when the handle bars are swung in different positions or they create a wind brake during certain handle bar movements which tends to throw or push the motorcycle over. The instant invention overcomes the disadvantages of these prior art structures by providing a windscreen-carrying shield fixedly mounted on the motorcycle frame and a shell interconnected to the motorcycle fork for movement with said fork and the headlight connected thereto.

SUMMARY OF THE INVENTION

In accordance with one form of the invention, a generally U-shaped yoke is connected to the motorcycle frame and projects laterally outwardly and upwardly from said connection. The yoke supports a generally U-shaped shield having a pair of leg panels interconnected at their upper ends by a transverse top panel. The top panel extends rearwardly from the upper ends of the leg panels and has an upwardly projecting windscreen mounted thereon.

The top panel is disposed above the plane of the handle bars, and it has a recess formed its forward edge through which the motorcycle fork projects. A mounting bracket is connected to said fork and projects outwardly through the recess in the top panel to support the motorcycle headlight. A shell having an opening for reception of the headlight is interconnected to said bracket forwardly of the shield and is thus movable with the headlight and handle bars.

A mud guard is mounted on brackets connected to the fork. The mud guard is mounted on the fork in a position below the shell and forwardly of the shield to block the flow of air and dirt into the space between the leg panels.

BRIEF DESCRIPTION OF THE DRAWINGS

The accompanying drawings illustrate the invention. In such drawings:

FIG. 1 is a fragmentary side elevation of a motorcycle having a fairing embodying the invention mounted thereon;

FIG. 2 is a fragmentary front elevation of the motorcycle and fairing shown in FIG. 1;

FIG. 5 is a horizontal section taken on the line 5—5 of FIG. 1.

DETAILED DESCRIPTION OF THE PREFERRED EMBODIMENT

Figure 4:
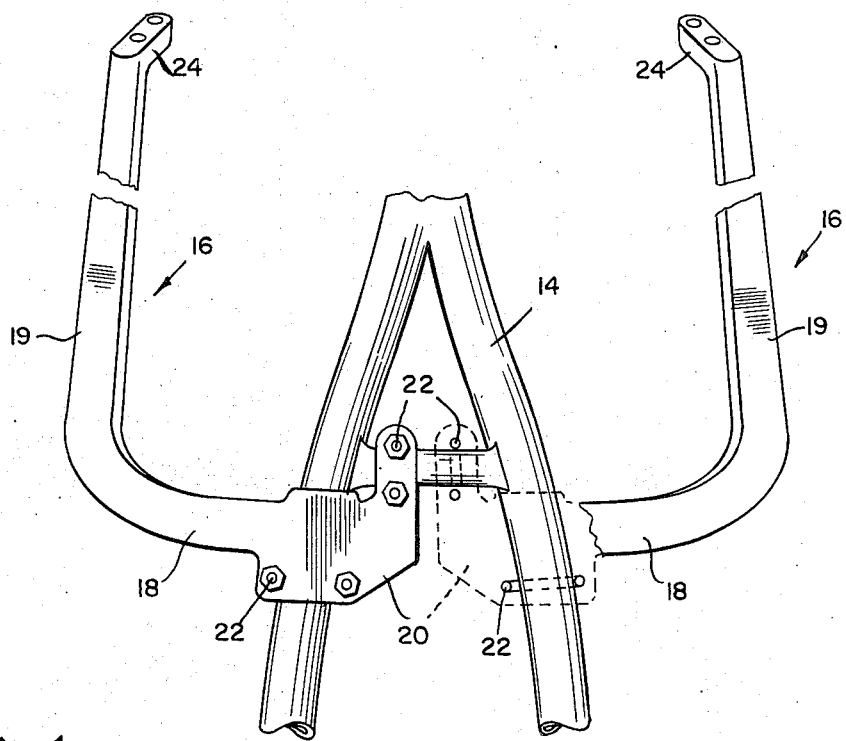
FIG. 4 is a front elevation of the fairing mounting yoke shown in FIG. 1.

As shown in the drawings, the fairing is provided with a shield 10 mounted on a yoke connected to the front frame 14 of a motorcycle. As is best illustrated in FIG. 4, the yoke is formed by a pair of generally L-shaped arms 16 which are identical in their construction. Each of the arms comprises a lower generally horizontal stretch 18 integrally joined at its outer end to a generally vertical stretch 19. A plate 20 is mounted on the inner end of the arm stretch 18 and is rigidly connected to the frame 14 as by a pair of U-bolts 22. The upper end of the arm stretch 19 is integrally joined to a generally horizontal rearwardly projecting finger 24 for connecting the yoke to the shield 10 as will be more fully described hereinafter.

The shield 10, which has a generally U-shaped configuration, comprises a pair of vertically extending leg panels 26 disposed on opposite sides of the motorcycle and interconnected at their upper ends by a transversely extending generally horizontal top panel 28. As shown in FIGS. 1 and 5, the leg panels are angled upwardly and forwardly from the engine 30 to their juncture with the top panel 28 above the plane of the handle bars 32. The leg panels thus cross through the plane of the yoke with their lower portions disposed rearwardly of said yoke and their upper portions forwardly of said yoke. Each of said leg panels has an opening 35 therein through which one of the arm stretches 19 extends.

As shown in FIG. 5, the lower portion 37 of the leg panels 26, that is that portion generally below the opening 35, has a rearwardly open U-shaped cross-section to shield the rider's legs. The upper portion 38 of said panels, that is that portion disposed generally between the openings 35 and the top panel 28, flares laterally outwardly and is curved slightly forwardly with respect to the lower portion 37. This disposes the forward edge of the portions 38 slightly rearwardly of the front of the headlight 40. As seen in FIG. 1, the outer rearward edge of the leg panel portions 38 is curved forwardly, as at 42, to allow sufficient clearance for the swinging movements of the handle bars 32.

The top panel 28 extends transversely across the front of the motorcycle forwardly of the fork 43 to interconnect the upper portions 38 of leg panels 26. The rearwardly disposed edge of the panel 28 has an arcuate recess formed therein, and an upwardly projecting flange 46 extends along said recess. A windscreen 48 which may be of any desired size and shape is mounted on the flange 46 as by bolts 50.

The panel 28 rests on the yoke arm fingers 24 and is fixedly connected to said fingers as by bolts 52 for rigidly mounting the shield on the motorcycle frame. The panel 28 curves forwardly and downwardly from its connections to the fingers 24 with the forward edge of said panel terminating within the longitudinal extent of the headlight 40. A recess 53 is formed in the forward edge of the panel to permit lateral swinging movement of the headlight 40 and its mounting brackets 41 with the handle bars 32.

Figure 3:
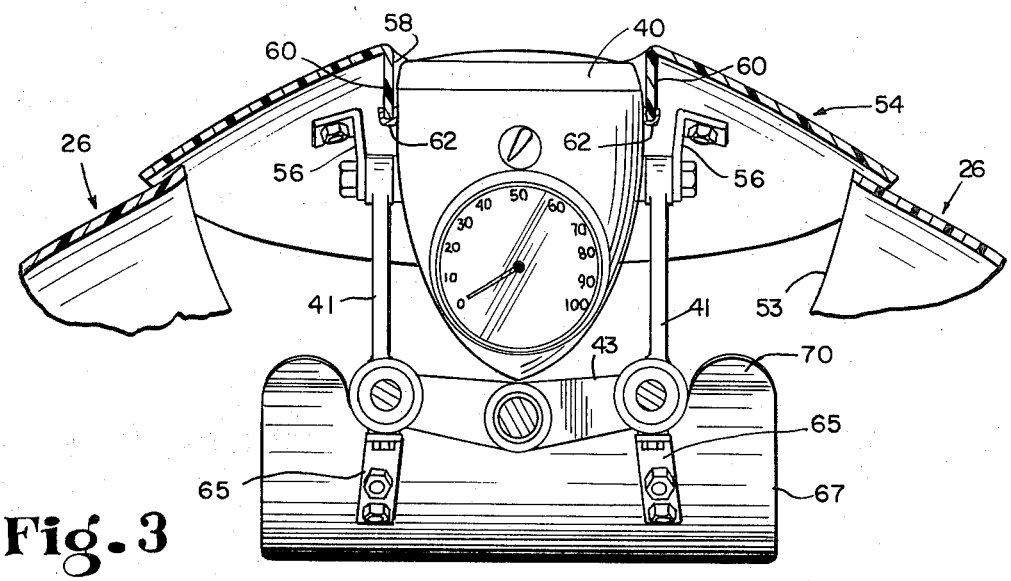
FIG. 3 is a horizontal section taken on the line 3—3 of FIG. 2.

A generally elliptically shaped shell 54 extends across the central forwardly disposed portion of the shield to cover the top panel recess 53. As shown in FIG. 3, the shell has a cup-shaped cross-sectional configuration and is mounted on the headlight brackets 41 by a pair of brackets 56. In this manner, the shell is movable with the headlight 40 and fork 43 upon movement of the handle bars.

An opening 58 is formed in the shell 54, and an annular flange 60 projects rearwardly from said opening to form a seat for the headlight 40. Desirably, a resilient bumper 62 is mounted on the rear edge of the flange 60 to cushion the headlight and shell against their relative vibrating movements.

As shown in the drawings, the shell 54 has a cross-sectional extent larger than the recess 53 and the lateral spacing between the upper portions 38 of the leg panels 26. Thus, with the shell's cup-shaped configuration, and the curvatures of the leg and top panels 26 and 28, the shell will swivel over the adjacent portions of the top and leg panels 28 and 26 in the same manner as a ball and socket joint during the movement of the handle bars.

A pair of L-shaped brackets 65 are mounted on the fork 43 below the headlight brackets 41. The brackets 65 are connected to a mud guard 67 as by bolts 68 for mounting said guard on the fork 43 below the shell 54 and in front of the leg panels 26. As best shown in FIGS. 1 and 2, the guard 67 has a lateral extent greater than the fork 43, and is provided at its ends with a pair of upwardly projecting ears 70 whose upper ends are disposed in front of the lateral ends of the shell 54. The mud guard, which is movable with the handle bars and fork, is thus disposed in a position on the motorcycle to prevent air, mud, etc. from moving rearwardly in the space between the leg panels 26 below the shell 54. As shown in FIG. 1, the guard 67 has a sinusoidal configuration for directing air flow generally downwardly and forwardly.

While the shield 10, shell 54, and guard 67 can be formed of any desired rigid material, I have found that they can be easily and quickly molded from materials such as polyester reinforced fiberglass, glass reinforced thermoplastics, vacuum formed polycarbonates, acrylics, and the like.

I claim:

1. A fairing for a motorcycle, comprising a yoke connected to the frame of said motorcycle and extending laterally outwardly and upwardly from its connection to said frame, a shield having a pair of laterally spaced vertically extending leg panels interconnected at their upper ends by a transversely extending generally horizontal top panel disposed above the plane of the motorcycle handle bars and connected to the upper end of said yoke, a windscreen mounted on said top panel, said top panel having a recess formed therein through which the fork on the motorcycle and the motorcycle headlight and its mounting brackets extend, and a shell interconnected to said mounting brackets for movement with said fork and headlight, said shell extending over the recess formed in said top panel and having an opening formed therein for reception of said headlight.

2. A fairing as set forth in claim 1 in which said leg panels angle forwardly from their lower to their upper ends and said yoke projects through openings in said leg panels, and said top panel extends forwardly and rearwardly of said fork and yoke.

3. A fairing as set forth in claim 1 in which said yoke comprises a pair of generally L-shaped arms each having its lower end connected to said frame, and a generally horizontally disposed finger at its upper end fixedly connected to said top panel.

4. A fairing as set forth in claim 1 with the addition that a mud guard is mounted on said fork below said shell and forwardly of said leg panels.

5. A fairing as set forth in claim 4 in which said mud guard has a lateral extent greater than said fork and a pair of ears project upwardly from the ends of said mud guard over the lateral ends of said shell.

6. A fairing as set forth in claim 1 with the addition that an annular flange projects rearwardly from the edge of said shell opening around said headlight.

7. A fairing for a motorcycle, comprising a yoke connected to the frame of said motorcycle, a shield connected to said yoke and having a pair of vertically extending leg panels interconnected at their upper ends by a transversely extending top panel disposed above the plane of the motorcycle handle bars, the upper portions of said leg panels being curved forwardly and the forward portion of said top panel being curved downwardly, said top panel having a recess formed therein through which the fork on the motorcycle and motorcycle headlight and its mounting brackets extend, a windscreen mounted on said top panel, a cup-shaped shell interconnected to said mounting bracket for movement with said fork and headlight, said shell extending over said top panel recess and the adjacent portions of said top and leg panels, and said shell having an opening formed therein for the reception of said headlight.

8. A fairing as set forth in claim 7 in which said top panel has a vertically extending flange at the rear thereof and said windscreen is connected to said flange.

9. A fairing as set forth in claim 7 in which said yoke projects upwardly from its connection to said frame and is connected to said top panel above the plane of said handle bars, and said leg panels are angled forwardly through the plane of said yoke, said leg panels having a rearwardly open U-shaped cross-section below their intersection with said yoke.

* * * * *